United States Patent
Jacob

(10) Patent No.: US 9,009,289 B1
(45) Date of Patent: Apr. 14, 2015

(54) SYSTEMS AND METHODS FOR ASSESSING APPLICATION USAGE

(71) Applicant: Flexera Software LLC, Itasca, IL (US)

(72) Inventor: Jiju Jacob, Bangalore (IN)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 14/230,515

(22) Filed: Mar. 31, 2014

(51) Int. Cl.
| | | |
|---|---|---|
| G06F 15/16 | (2006.01) | |
| G06F 15/173 | (2006.01) | |
| G06Q 30/02 | (2012.01) | |
| H04L 12/26 | (2006.01) | |
| G06Q 50/18 | (2012.01) | |

(52) U.S. Cl.
CPC ............ *G06Q 30/0206* (2013.01); *H04L 43/08* (2013.01); *G06Q 50/184* (2013.01); *Y10S 707/9994* (2013.01); *Y10S 707/99941* (2013.01)

(58) Field of Classification Search
USPC ......... 709/201, 202, 203, 206, 219, 220, 221, 709/223, 224, 225, 226, 227, 228, 231, 235, 709/237; 707/10, 999.01, 999.1, 601, 769, 707/803; 718/104, 105, 100; 370/216, 231
IPC ..... G06F 17/30604,17/30595, 17/30, 17/30587, G06F 17/30286, 11/3433, 11/3495, 11/3414, G06F 11/349, 11/3404, 11/3409, 11/3423, G06F 11/2007, 11/30, 2201/865, 2201/875, G06F 9/4856, 9/5072, 9/54, 9/06, 9/5038, G06F 9/5044, 9/505, 9/546; H04L 43/0817, H04L 43/0811, 43/04, 67/1002, 67/1008, H04L 67/101, 67/10; G06Q 30/0206, 50/184
See application file for complete search history.

(56) References Cited

U.S. PATENT DOCUMENTS

| | | | | |
|---|---|---|---|---|
| 7,058,560 | B1* | 6/2006 | Arakawa et al. | 703/22 |
| 7,552,208 | B2* | 6/2009 | Lubrecht et al. | 709/223 |
| 8,595,331 | B2* | 11/2013 | Henseler et al. | 709/220 |
| 8,706,879 | B2* | 4/2014 | Sparks | 709/226 |
| 2006/0173984 | A1* | 8/2006 | Emeis et al. | 709/223 |
| 2006/0173994 | A1* | 8/2006 | Emeis et al. | 709/224 |
| 2006/0200494 | A1* | 9/2006 | Sparks | 707/104.1 |
| 2007/0169049 | A1* | 7/2007 | Gingell et al. | 717/151 |
| 2007/0233698 | A1* | 10/2007 | Sundar et al. | 707/10 |
| 2007/0271276 | A1* | 11/2007 | Allen et al. | 707/10 |
| 2007/0288791 | A1* | 12/2007 | Allen et al. | 714/4 |
| 2013/0232498 | A1* | 9/2013 | Mangtani et al. | 718/104 |

* cited by examiner

*Primary Examiner* — Saket K Daftuar

(74) *Attorney, Agent, or Firm* — Michael A. Glenn; Perkins Coie LLP

(57) ABSTRACT

Various of the disclosed embodiments disclose systems and methods for assessing usage of a resource, such as hardware, software, or firmware, in a computer system. For example, some embodiments contemplate a model in which an enterprise application derives its license cost based upon the actual business value provided by the licensed resource to the enterprise. If an enterprise has purchased software that it uses very heavily, then the license cost may increase. Conversely, if the enterprise uses the software rarely, then the license cost may decrease. This usage granularity may allow an enterprise executive to purchase a software license without fear that the software will be inefficiently utilized. A licensor may similarly use the system to charge more accurate fees.

20 Claims, 9 Drawing Sheets

| Weight Name | Recommended Values |
|---|---|
| Relative weight of Server Characteristics | 0.20 |
| Relative weight of Middleware Characteristics | 0.80 |

| Weight Name | Recommended Values |
|---|---|
| One of the following parameters<br>• % Processor Time utilized<br>• % Utilization based on Processor Queue Length<br>• Context Switches per Second | 0.75 |
| Memory Utilization | 0.25 |

| Criteria Name | Weights |
|---|---|
| *Business Tier Criteria* | |
| JSP – # of requests per second during last interval | 0.4 |
| MQ – # of messages sent/received in channel | 0.15 |
| MQ – Local/Remote Queue percentage used | 0.15 |
| JTA – # of active transactions | 0.3 |
| *DB Tier Criteria* | |
| Average Rate of database static and dynamic SQL statement | 0.5 |
| Average physical/logical/direct reads/writes to the database/cache | 0.5 |

SYSTEMS AND METHODS FOR ASSESSING APPLICATION USAGE

FIELD

Various of the disclosed embodiments concern systems and methods for assessing usage of a resource in a computer system.

BACKGROUND

Software and hardware resources are critical to the infrastructure of most modern businesses. A business enterprise may depend upon several different pieces of enterprise software. Each software program may in-turn consume several licenses and costly hardware. For example, a company payroll system may consume a few licenses each for its databases (e,g., an Oracle® database) and a few licenses for its Application and Web Tiers (such as IBM WebSphere®). This payroll system may accordingly generate enormous costs, though the actual benefit it confers may be difficult or impossible to quantify.

Ideally, an enterprise could assess whether an application is sufficiently used and whether the usage of costly hardware and software warranted continued investment and upkeep, e.g., in both capital expenditures (CAPEX) and operational expenditures (OPEX). Such transparency may help the enterprise to optimize the amount of licenses that need to be purchased in order to keep the application running. Based upon this analysis, the enterprise may decide, e.g., to shut down the application entirely or to optimize the resources dedicated to this application.

Historically, enterprise software may generally be licensed in two major ways—a "Per CPU License" or a "Per User License". In a "Per CPU License" based model, the software vendor's billing may be based on how many processors/resources are dedicated to the enterprise application. The enterprise purchasing this software may have no idea how much business value the software has conferred, but the enterprise may still pay the software vendor a regular fee.

In a "Per-User License", the license cost can be based on the number of users who have signed up to use this application. Generally, the enterprise is billed even if the user is not adequately using the software. The enterprise, in this case too, ends up paying money without any clear understanding of the actual business value conferred by the application.

Accordingly, there exists a need for more granular and transparent systems and methods to assess application usage. These systems and methods may be used to reduce costs, narrowly tailor licenses, and to make the software licensing process generally more efficient.

BRIEF DESCRIPTION OF THE DRAWINGS

One or more embodiments of the present disclosure are illustrated by way of example and not limitation in the figures of the accompanying drawings, in which like references indicate similar elements.

FIG. 7 is a table depicting certain example server characteristic weight values as may occur in some embodiments.

FIG. 8 is a table depicting certain example weighting values for business tier and database tier criteria as may occur in some embodiments.

Figure 1:
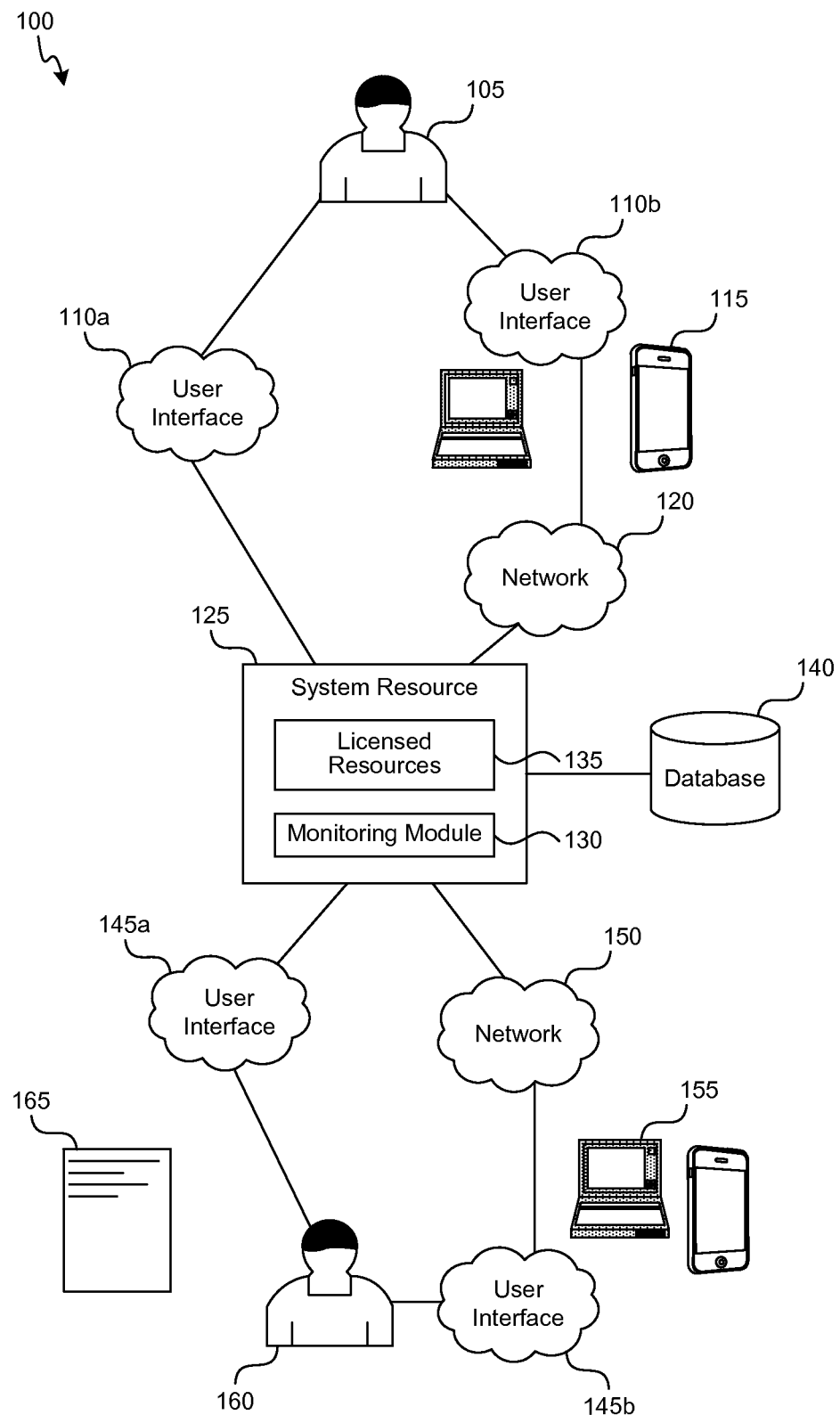
FIG. 1 is an example system topology for using, monitoring, and billing for a software and/or hardware resource as may occur in some embodiments.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System Topology Overview

Various of the disclosed embodiments disclose systems and methods for assessing usage of a resource in a computer system. For example, some embodiments contemplate a model in which an enterprise application derives its license cost based upon the actual business value that the software provided to the enterprise which purchased it. If an enterprise has purchased software that it uses very heavily, then the license cost may increase. Conversely, if the enterprise uses the software rarely, then the license cost may decrease. This usage granularity may allow an enterprise executive to purchase a software license without fear that the software will be inefficiently utilized. Conversely, finer usage granularity may allow a licensor to charge more accurate fees. Though reference is often made herein to usage assessment for purposes of determining a licensing cost, one will readily understand that the disclosed techniques will also apply to usage determinations for monitoring, threat assessment, redundancy determinations, key-component determinations, etc.

In order to more closely associate licensing cost with actual software usage, some embodiments first measure the actual business value that software delivers to the enterprise, e.g., by converting the actual business value into a numerical representation. This numerical representation is generally referred to herein as an "Application Usage Score" (AUS).

FIG. 1 is an example system topology for using, monitoring, and billing for a software and/or hardware resource as may occur in some embodiments. A user 105, for example, an employee of an enterprise, may use a system resource 125, directly via an interface 110a or remotely across network 120 via an interface 110b, of a computing device 115. Network 120 may be, e.g., an enterprise local network, an internal network, the Internet, etc.

System resource 125 may be any computing resource having licensed components thereon, e.g., a personal computing system, a server system, a computer mainframe, a remote sensing system, etc. The system resource 125 may include a licensed resource module 135. The licensed resource module 135 may include, e.g., one or more software programs, SDKs, libraries (e.g., dynamic linked libraries DLLs), licensed hardware, etc. A monitoring module 130, such as a software program, may be present to implement various of the monitoring activities described herein. Though monitoring module 130 is located on system resource 125 in this example, the module may interface with the system resource 125 remotely in some embodiments. A database 140 may be in communication with the system resource 125 and may be used, e.g., to store transaction logs, records of usage, etc.

While the user 105, or enterprise, may self-report usage of licensed resource(s) 135 in some embodiments, in the depicted example a licensing auditor 160 may monitor the system resource 125, e.g., directly through an interface 145a or across a network 150 (e.g., the same or different network as network 120) via the interface 145b of computing device 155. The licensing auditor 160 may consult the results of monitoring module 130, to generate an usage report 165 used to bill the enterprise or user 105 directly. In some embodiments, the licensing auditor 160 may be a member of the enterprise, and may monitor the usage to predict and control costs.

N-Logical Tier Enterprise Systems

In some embodiments, the system resource 125 may be an n-tier enterprise application. Some embodiments determine the AUS of such a system with reference to the various tiers. Decomposing a system resource, even if not officially constructed as such, into multiple tiers may facilitate flexibility and re-usability. Some tiered systems include a client-server architecture in which presentation, application processing, and data management functions are logically separated.

Figure 2:
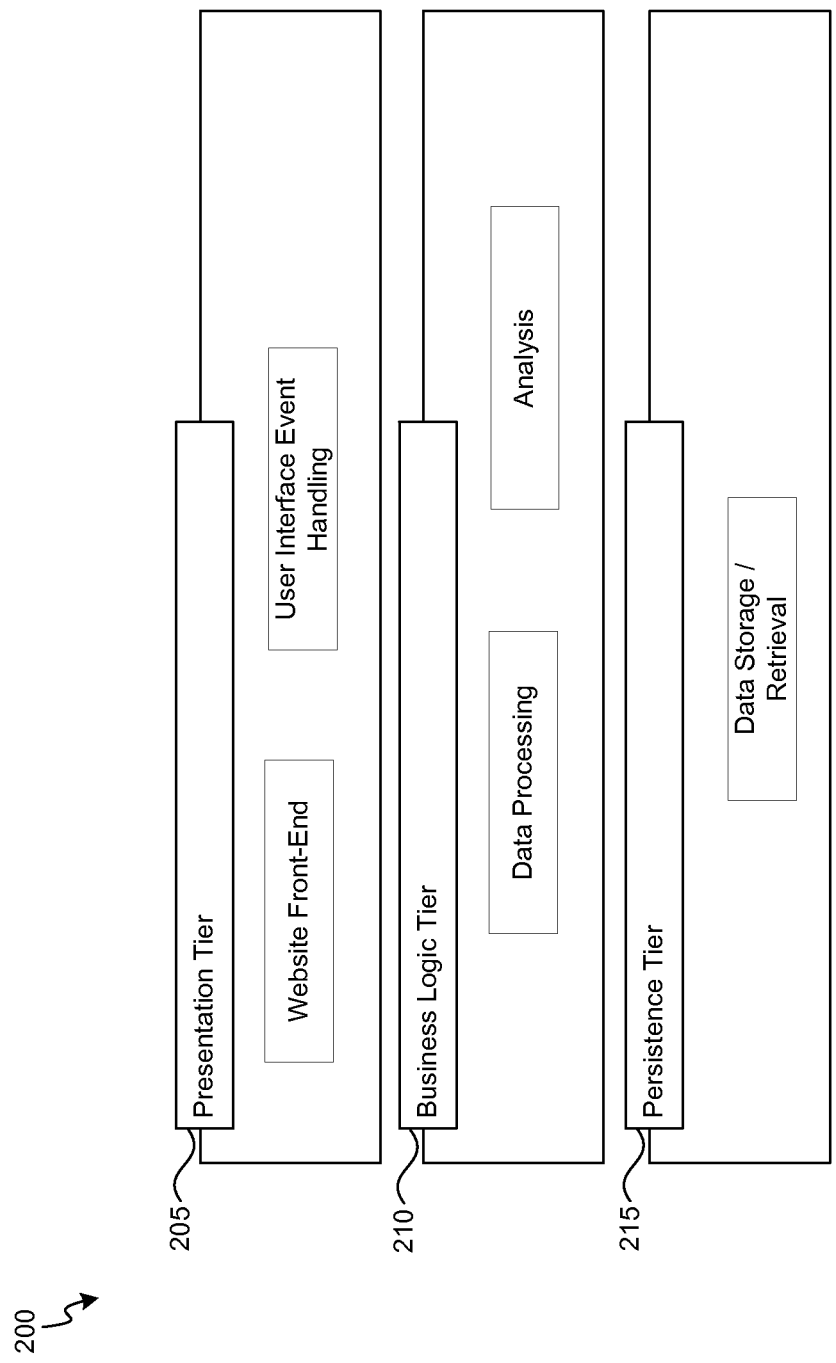
FIG. 2 is a block diagram depicting the relationship between different business logic tiers as may occur in some embodiments.

FIG. 2 is a block diagram depicting the relationship between different business logic tiers as may occur in some embodiments. Generally speaking, enterprise software may be generally segregated into a presentation tier 205, a business logic tier 210, and a persistence tier 215. The presentation tier 205 may include interactions with a graphical user interface (GUI). The presentation tier 205 may organize the business entity data and processes into a form suitable for user understanding.

The business logic tier 210 may form the "core" of an application, e.g., processing and analyzing the underlying data to produce a meaningful format suitable for display at the presentation tier 205. Finally, the persistence tier 215 may be used to handle data storage and retrieval, e.g., from a database 140. The persistence tier 215 may also be responsible for ensuring various forms of data integrity for the application. Although only three tiers are depicted in this example for purposes of explanation, one will recognize that many more tiers may exist in some systems and the tiers may include sub-tiers performing various dedicated functions.

In some embodiments, each tier may be in-turn composed of several nodes that perform in concert to provide the tier's functionality. A node may be a discrete computational resource, e.g., a single server system, or a discrete instance of a running program designed to handle a portion of the load on a given tier. A node may be independent of other nodes or may share varying degrees of dependency for load management. In some embodiments, each tier node may perform a slightly different function and in some embodiments the nodes may share the workload among themselves. A load-balancer associated with the tier may receive requests and re-route the request to an appropriate node based upon the load-balancing policy. The load-balancer may also optionally forward the responses to the originator. Load balancing may be achieved by many different strategies, e.g., Round-Robin, Least-Response-Time, etc. Thus, some embodiments will monitor across each node that constitutes the tier to ensure load balancing. This load-balanced nature can be taken into consideration during the subsequent assessment of a given tier when computing the net Application Usage Score.

Example User Request Handling Event

Figure 3:
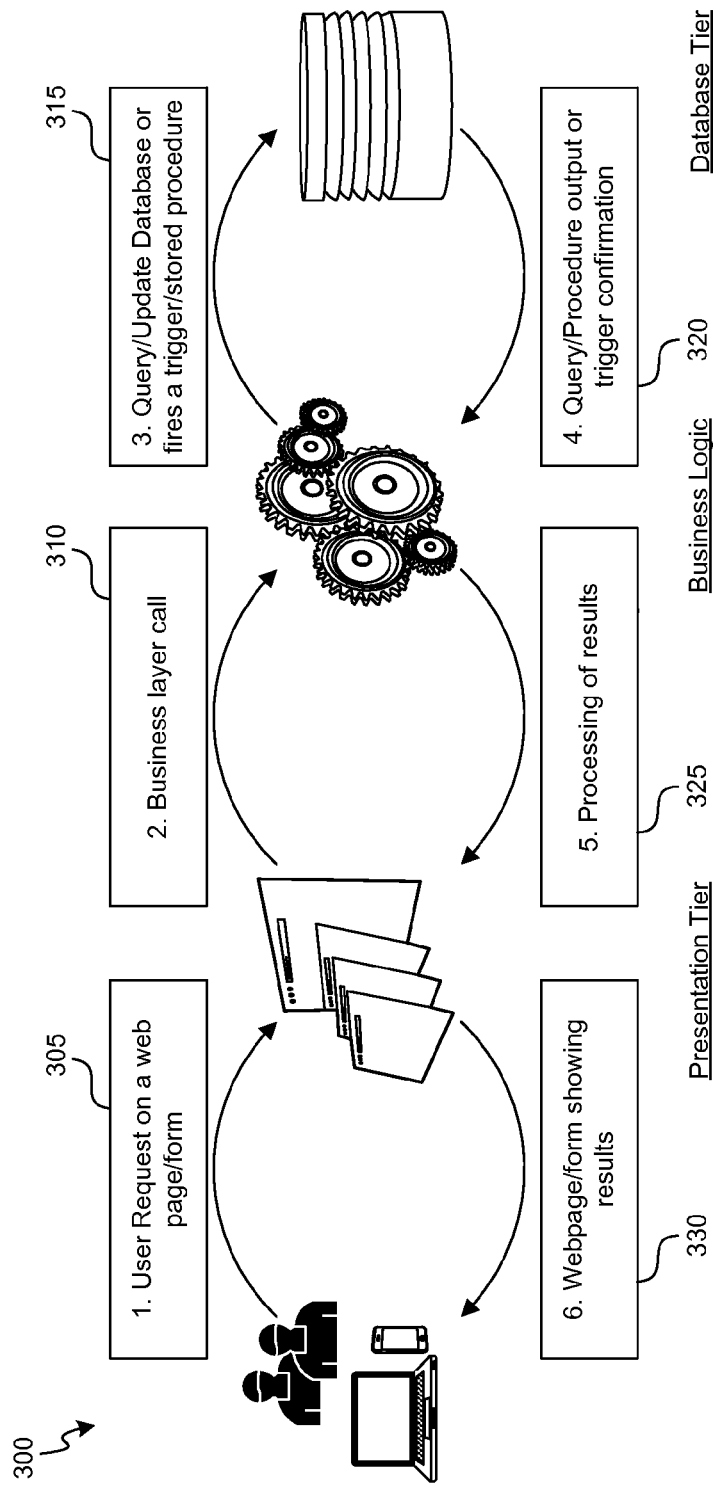
FIG. 3 is a graphical flow diagram of a user request handling event as may occur in some embodiments.

FIG. 3 is a graphical flow diagram of a user request handling event as may occur in some embodiments. At block 305 a user 105 may request a resource, e.g., a webpage, from a system 125. The system 125 may transfer the request into a business tier layer call at block 310. At block 315, the business tier layer may query/update a database 140 or trigger a procedure to do so or to perform a related operation. At block 320, the system may output the results of the query/procedure or triggered operation. At block 325, the business logic may process the results and at block 330, the results may be presented for consideration by the user 105.

Usage Score

In some embodiments, the AUS of a business application may indicate how much the application is in fact being used to serve business requests. As "usage" may depend upon context, the AUS may reflect widely different behaviors between different enterprises and different applications. For example, the AUS may depend upon the nature of the application. An application acting as a "sleeper" application, operating as a background process (e.g., a monitoring application, a disaster recovery application, etc.) might have a very low usage when compared with an active application.

Thus, a sleeper or monitoring application may have a different set of weights to calculate the usage of the application. In some enterprises, multiple instances of the same enterprise software may be performing different roles. For example, there may be two instances A1 and A2 of banking application running at an enterprise. A1 may be the primary server servicing requests, but A2 may be the standby system which might take over once A1 fails. Different sets of weights may be required to monitor the business value that is generated by A1 and the value that is generated by A2.

In some embodiments, usage could also vary with the time period in which the application is being used. For example, an application monitoring the stock market could be very busy in the business hours and almost completely unused during off-business hours. As another example, a shopping website may experience higher loads during Christmas season, whereas during other months, the website could experience much smaller loads. Some embodiments anticipate that the program is only likely to be used within these certain time periods. Accordingly, the "total possible" duration of use associated with the program may not be a 24 hour day or a 365 day year, but some subset determined based upon these expected usage intervals.

In this manner, enterprises may have varying definitions of what constitutes software "business value". For example, one enterprise may consider an application "in use" being widely used if its runtime is more than 50% of the time in a given period, whereas another enterprise may define that limit as 75%. An algorithmic trading tool may be considered "underused" if it is in operation less than 98% of a 24 hour period. In contrast, a physical inventory assessment tool may be considered "overused" if run more than twice a day.

To accommodate these varying perceptions of "usage", some embodiments determine usage based upon "characteristics" and "weights". Characteristics as referred to herein may include measureable aspects of the Application, or part of the Application, that contribute to the performance of the Application. For example, the number of database transactions per second, may be a suitable characteristic. Examples of various characteristics are described in greater detail below.

"Weights" as referred to herein, may include factors determining broadly how each characteristic contributes to the overall Application Usage Score (e.g., with consideration to a business' conception of "business value"). Thus, in a very generalized form, the AUS may be represented as:

Application Usage Score($\mu$)=Sum of(characteristics*corresponding weights)

In some embodiments, the usage score is within a range, e.g., a number between 0.0 and 1.0 (or between 0% and 100%). In some embodiments, the sum of all weights will always be 1. In some embodiments, each characteristic may be normalized to a value between 0 and 1, and may together sum at each of their 100% values to 1. These conditions provide a structure to the analysis conducive to usage representation. For example, an enterprise manager can compare the AUS results of widely different software packages having very different characteristics when they are normalized in this manner.

Generalized Example Algorithm Operation

Figure 4:
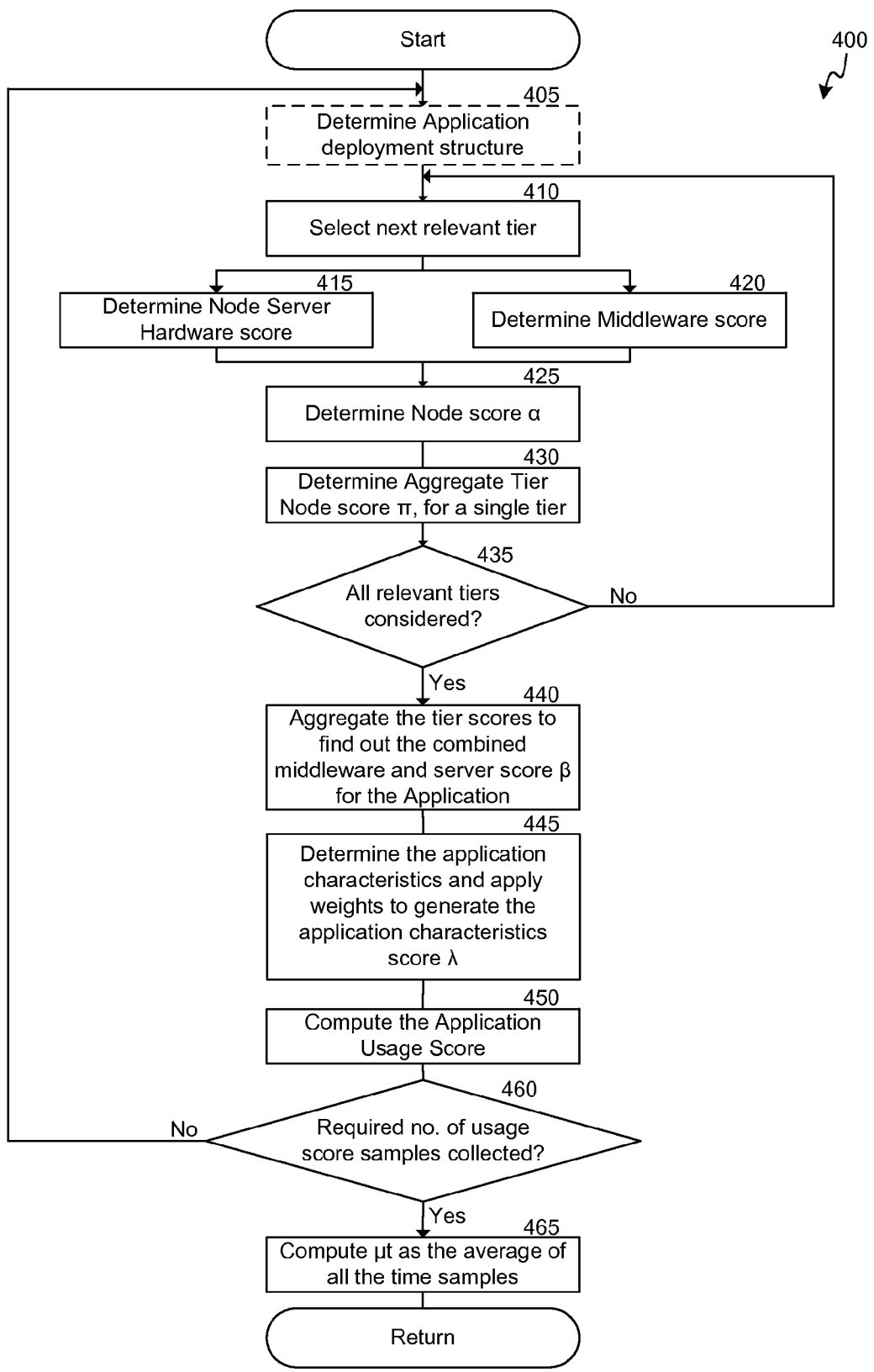
FIG. 4 is a flow diagram depicting certain features of an Application Usage Score (AUS) determination process as may occur in some embodiments.

FIG. 4 is a flow diagram depicting certain features of an AUS determination process 400 as may occur in some embodiments. Process 400 may be run by an auditor for billing purposes, by a user to assess usage, by a manager to manage costs, etc. The process 400 may be run, e.g., on system resource 125, device 155, or device 115. In some embodiments, the process may even be included as a sub-module of an enterprise application that automatically determines the AUS.

At block 405, the system may determine an application deployment structure. For example, the system may determine how an application interacts with various tiers, which nodes in each tier are utilized by the application, etc. This block may involve updating the results of a previous determination. The determination may be made by referencing a usage database provided by the application, or by identifying a record of processes associated with the application running on various nodes.

This step may determine the application's deployment structure, the number of tiers that are deployed, and the number of nodes that service each tier. This determination may need to be refreshed from time to time for various reasons, e.g.: a shopping application might have scaled-up (or automatically added) extra nodes to its tiers during Christmas season; a Stock Market application might have scaled-down (or reduced) few nodes for its during the night time; an administrator might have taken out a given node from a tier because he found that the hard drives need some maintenance.

In some cases, the determination may also be performed where certain deployments completely do not use a given tier. For example, an Application that is bought by the enterprise might support its presentation tier as mobile-friendly pages and server-friendly pages, both of which are serviced by different sub-tiers of the presentation tier. If the enterprise decides to not expose its mobile functionality to the users, then the mobile sub-tier may need to be discounted from the overall evaluation even if it remains technically deployed.

At block 410, the system may select the next relevant tier, including the relevant nodes associated with the tier. In some embodiments, the system may select all the nodes in a tier. In some embodiments, the system may discriminate among the nodes, selecting only those with some threshold association to the application.

At block 415, for all the nodes constituting a given tier, the system may determine a node server hardware score by summing weighted characteristics of the server hardware as described in greater detail herein. At block 420, the system may determine a middleware score by summing weighted characteristics of the middleware associated with a given node as described in greater detail herein.

At block 425, the system may determine a node score α. As discussed in greater detail below, node score α may be defined as:

$$\alpha = \text{ServerHardwareScore} * W_s + \text{MiddlewareScore} * W_m$$

Figure 5:
FIG. 5 is a table depicting certain example server and middleware weighting values as may occur in some embodiments.

The weights $W_s$ and $W_m$ may be separate from the weights applied to each hardware and middleware characteristics, instead reflecting a holistic assessment of the server hardware and middleware's relevance to usage determination for a specific node. Example weights are depicted in FIG. 5.

At block 430, the system may determine an aggregate tier node score π for the tier under consideration. For example, the system may take a weighted sum of the node scores for each of the nodes. In some embodiments the same weight may be applied to each node score (e.g., 1), while in other embodiments the nodes associated with more usage activity may be more highly weighted.

In some cases, the node score may be obtained by aggregating each individual node score and applying an equal weighting for each of the sub or related-nodes that constitute the node, truly reflecting the load balancing nature of the node. In some cases, where the load balancing of the individual nodes has been set in an asymmetric manner, e.g., where a few nodes take a heavier load while a few nodes take a lighter load of requests, then an appropriate adjustment needs to be made to the weights applied to each of the nodes.

The individual scores of each of the tiers may be averaged to find the combined Application Hardware & Middleware Score (β) (described below at 440). During this process, the workload differentiation may be established. As an example in the presentation tier, some nodes may be reserved for serving requests from mobile devices whereas some nodes may be reserved for serving requests from desktop/server users. If the amount of mobile users is very small, then nodes dedicated to mobile request servicing might experience less load compared to nodes that are servicing requests from desktop/server based users. An appropriate adjustment in the node assignments may be made to appropriately distribute the workload.

At block 435, the system may determine if another tier is to be assessed. If so, the next tier may be selected at block 410. Alternatively, the system will begin assessing the aggregate tier behavior at block 440.

At block 440, the system may aggregate the tier scores to find out the combined middleware and server score for application β. The node score of a single node a may be aggregated to form the tier score π. The scores of each of the tiers may then be aggregated to form β.

Accordingly, the scores α, π and β may represent an aggregation of the middleware and hardware component scores for the node, tier and application respectively and may not yet incorporate the application characteristic scores. The aggregate score β may be combined with the application characteristics score λ to give the AUS μ.

At block 445, the system may determine the application characteristics and apply weights to generate the application characteristics score λ. Though depicted as occurring at this position in the sequence of blocks, as indicated elsewhere, one will recognize that this block and many of the others may occur in variations of this example order. Accordingly, the application characteristics score may have been previously determined and stored for subsequent use. In some embodiments the application characteristics score is determined once for multiple subsequent assessments, while in some embodiments the application characteristics score is assessed at the beginning of each assessment (e.g., at block 405 or following block 410).

At block 450, the system may compute the Application Usage Score as described in greater detail below (e.g., AUS μ is calculated as an aggregation of β and λ).

At block 460, the system may determine if an adequate number of usage scores have been determined. This operation may be performed to ensure that the AUS is aggregated for an appropriate time period.

At block 465, the system may compute the average AUS μt as the average (or other suitable combination) of all the time samples. Though described as an "average" in this example, this step may generally reflect the generation of a holistic usage determination based upon multiple independent AUS values at different points in time. While the characteristics selection and weightings may already reflect industry and/or enterprise expectations for the application's typical usage conditions, aggregating multiple AUS determinations over time may further serve to smooth out errors, the peculiarities of individual users, etc. and to more accurately reflect overall usage behavior by the enterprise.

The set of criteria used to determine the number of time periods or number of AUS values (μ) to measure in order to arrive at μt may include the business nature of the application (Actively used application vs. Passive Application) and the relevant business activity cycles (high usage at one time period vs. low usage at other time periods).

Characteristics and Aspects of the AUS

In some embodiments, the AUS may be determined based upon on a variety of characteristics. Hardware characteristics of the server (or groups of servers) that host the application (e.g., at the node) may be considered in some embodiments. The hardware may have multiple applications or operating systems running upon it. Some embodiments may focus upon the part of the hardware (or resources) actually used by the Application or its constituent tiers. The system may also consider characteristics of the middleware that run on these servers, as well as characteristics of the application that is actually running.

An AUS determined from one isolated time period may give a skewed picture of the holistic Application Usage. Accordingly, some embodiments employ a time trend of the AUS (e.g., as discussed above at blocks 460-465).

As discussed above, an enterprise application might have some tiers which are load balanced. In some embodiments, at a clustered node (or load balanced node) the characteristics of the server and the middleware characteristics of each node may be aggregated and then the same data aggregated across all the nodes. However, as the application may be delivered by all the nodes in concert, the application characteristics may be measured without consideration to each of these nodes.

Many middleware architectures and server hardware have APIs which may be used to monitor certain aspects of performance. Some parameters necessary for computation may not be available all the time via the API. The monitoring API might not be able to fetch values or may fetch values which are a bit stale as the server/middleware might be too busy to return this value. Such scenarios may affect the accuracy of the AUS estimation. Using a large number of AUS scores aggregated over a large time period may provide a better picture of the overall usage.

Accordingly, some embodiments seek to gauge the AUS on a large number of parameters for each tier. The weights for each of these parameters may not be constant with respect to time. Accordingly, some embodiments fine tune these weights or expose them as configuration parameters to a user.

Algorithm Features

For purposes of explanation, consider a Business Application having n-tiers. Each tier may be clustered/load-balanced across several nodes. Each node has a set of middleware (one or more instances) installed on it that serve this application.

Assume that the Business Application is composed of n-tiers $T_1, T_2, T_3 \ldots T_n$. The constants $C_1, C_2, C_3 \ldots C_n$ represent the number of nodes for each of these tiers. These nodes may be used for load balancing or may logically constitute the given tier. So in effect the total number of nodes that make up this application may be given by:

$$\sum_{i=1}^{n} C_i$$

where n=is the number of tiers and $C_i$ is the number of nodes for the i-th tier.

Each of these tiers may have multiple middleware components that have been installed on them. Let $M_1, M_2, M_3 \ldots M_n$ be the number of middleware components that have been installed that use tiers $T_1, T_2, T_3 \ldots T_n$. For purposes of this example explanation, assume that these tiers do not have any other middleware components that belong to other applications. For example, assume these servers and middleware are dedicated to the business application whose usage is being measured (some embodiments actively distinguish between relevant and irrelevant components, or may request user verification).

Thus, the total number of middleware (not number of actual instances) that make up this application is given by:

$$\sum_{i=1}^{n} M_i$$

where n=number of tiers and $M_i$=the number of middleware components in the i-th tier.

The total number of actual middleware instances in the ecosystem of this application may then be given by:

$$\sum_{i=1}^{n} (M_i * C_i)$$

where n=number of tiers, $M_i$=the no. of middleware components in the $i^{th}$ tier, and $C_i$=the number of nodes in the $i^{th}$ tier.

Server Hardware and Middleware Characteristic of One or More Nodes

Each server/node in this ecosystem may have a set of hardware characteristics such as "Memory utilized", "CPU throughput", etc., which may indicate how intensive the application usage is on this particular node. There may be many characteristics for each node and different nodes may have different characteristics. However, in some embodiments, these characteristics may not change across the types of servers. These server characteristics may be labelled as $SC_1, SC_2, SC_3 \ldots SC_R$. This criterion may be less relevant when different nodes are serviced by different set or types of hardware. In order to account for this discrepancy, the criteria selected for the server hardware measurement may be a ratio based characteristic such as a "Memory Utilization Ratio", etc.

Some embodiments further consider that the Server hardware/resource utilization may be across different processes (in addition to the middleware process itself). This may generate errors if not properly accounted for. Many middleware performance monitors support isolation of the hardware and resource usage to those consumed by the actual middleware process. In some embodiments, these scores alone may be adhered to. On any given node at any given point the resource utilization values for a given resource (e.g., the CPU) may contain an aggregate value of the actual middleware processes and also the usage by the OS processes. Accordingly, some embodiments only include the resource usage which is being used by the middleware instance servicing this particular application to truly reflect the usage of the application.

Many middleware servers support determining the resource usage for the particular middleware alone. Some embodiments vary the characteristic weights according to the enterprise and the type of the application. These weights are represented here as $WSC_1, WSC_2, WSC_3, WSC_R$. Accordingly, an independent evaluation of this node's hardware characteristics and its score can be defined as:

$$\sum_{i=1}^{R} (SC_i * WSC_i)$$

where $SC_i$ is the i-th Server Hardware Characteristic, $WSC_i$ is the weight assigned to this i-th Server Characteristic, there are R such characteristics for Server Hardware. Some embodiments may impose a condition that $$\sum_{i=1}^{R} WSC_i = 1 (\text{or } 100\%)$$

to facilitate more organized structural review.

The independent node may have one or more Middleware components associated with it. Let us assume that this node has M middleware components. Each middleware component may have a set of characteristics. Let us call these characteristics $MC_1, MC_2, \ldots MC_P$.

Let the relative weight of the characteristics of each middleware components be $WMC_1, WMC_2, \ldots WMC_P$. Hence the score of this node with respect to the Middleware can be defined as:

$$\sum_{i=1}^{P} (MC_i * WMC_i)$$

where $MC_i$ is the $i^{th}$ middleware characteristic, $WMC_i$ is the weight assigned to this $i^{th}$ middleware characteristic and there are P such characteristic for the middleware. Some embodiments may impose a condition that $$\sum_{i=1}^{P} WMC_i = 1 (\text{or } 100\%)$$

to facilitate more organized structural review.

At this point, some embodiments compute the combined hardware and middleware characteristic score for each individual node. An enterprise may define the weights of the middleware's score and the weight assigned to the score of the server hardware itself might not be equal in determination of its final score. For example, some Application Vendors/Enterprises may wish to say that the hardware utilization plays no role in the Application Usage Score. Some Application Vendors/Enterprises may wish to say that hardware utilization plays a heavier role in the Application usage score, e.g., heavy utilization of a graphics chip.

The differentiation of how much the hardware score should contribute to the overall usage score for a node may be different and may be configurable in nature by the Enterprise using the embodiment.

Let $W_m$ be weights of the middleware score and $W_s$ be the weights of the server hardware score. The total score of the server (including its middleware and hardware) can be denoted by $\alpha$ and is given by:

$$\alpha = \text{ServerHardwareScore} * W_s + \text{MiddlewareScore} * W_m$$

where, $\alpha$=Score of a node (including server hardware and middleware), $W_s$=Weight of the Server Hardware Score in the total score, $W_m$=Weight of the Middleware Score in the total score. Some embodiments may require that $W_s + W_m = 1$ (or 100%) to simplify analysis.

In an expanded form, this may be represented as:

$$\alpha = \left( \sum_{i=1}^{R} (SC_i * WSC_i) \right) * W_s + \left( \sum_{j=1}^{P} (MC_j * WMC_j) \right) * W_m$$

Further consolidating the score across a tier containing C such nodes, a simple average can be derived as a tier score in some embodiments. For example, a tier score $\pi$ for a specific tier may be given by $$\pi = \frac{\sum_{k=1}^{C} \alpha}{C}$$

A simple average may be inconsistent with the scaling policy of a given tier which has been set by the administrator. In some embodiments, the scaling policy might also specify a single trigger or multiple triggers for a scale up or a scale down of the tier.

In some embodiments, the scores of different tiers can be averaged together to produce a combined score $\beta$ for both the Server hardware and Middleware characteristics:

$$\beta = \pi / N = \frac{\frac{\sum_{k=1}^{C} \alpha}{C}}{N}$$

For example, the score of server hardware and middleware characteristic across the Application's ecosystem may be represented as $$\beta = \frac{\sum_{k=1}^{C} \alpha}{CN}$$

Application Characteristics Score

In addition to the characteristics described above, an application can itself have several such characteristics denoted by $AC_1, AC_2, \ldots, AC_z$ and each of them might be weighted by the enterprise using constants $WAC_1, WAC_2, WAC_z$. The score for the application characteristics may be defined by:

$$\lambda = \sum_{l=1}^{Z} (AC_l * WAC_l)$$

where $AC_1$=the $1^{th}$ Application characteristic, $WAC_1$=the weight assigned to the $1^{th}$ Application characteristic, of Z total such characteristics. Again, the condition may be imposed that $$\sum_{l=1}^{Z} WAC_l = 1 (\text{or } 100\%)$$

to ensure uniformity.

Generation of the Application Usage Score from Component Characterization Scores In some embodiments, the Application characteristics score and combined middleware/server score can be further combined to provide the "true usage" score of the Application (the terms "true usage" and AUS are used interchangeably herein). This is represented as the character $\mu$.

Application Usage Score ($\mu$)=Application Score*(Combined Hardware & Middleware) score:

$$\mu = \lambda * \beta = \left( \sum_{l=1}^{Z} (AC_l * WAC_l) \right) * \beta$$

For completeness, the expanded form of this relation may be expressed as:

$$\mu = \left( \sum_{l=1}^{Z} (AC_l * WAC_l) \right) * \frac{\sum_{k=1}^{C} \left( \left( \sum_{i=1}^{R} (SC_i * WSC_i) \right) * W_s + \left( \sum_{j=1}^{P} (MC_j * WMC_j) \right) * W_m \right)}{CN}$$

where AC=Application characteristics, WAC=Weight of Application Characteristics, SC=Server Hardware Characteristics, WSC=Weight of Server Hardware Characteristics, MC=Middleware Characteristics, WMC=Weight of Middleware Characteristics, C=No. of Nodes in a given tier, N=No.

of Tiers, MS=the middleware score, $W_s$=Relative Weight of server characteristics, and $W_m$=Relative weight of middleware characteristics.

Simplified Application Usage Score

In some embodiments, by assuming that the number of middleware co-deployed on a single piece of hardware is not more than 1, the concept of weighting on the formula can be simplified as follows $$\mu(\text{simplified}) = \left(\sum_{l=1}^{Z} (AC_l * WAC_l)\right) * \left(\frac{\sum_{k=1}^{C}\left(\left(\left(\sum_{i=1}^{R}(SC_i * WSC_i)\right) * W_s + MS * W_m\right)\right)}{CN}\right)$$

Such an assumption may be true in typical production grade deployments in enterprises.

Application Usage Time Dimension

Some embodiments determine the μ score for varied time periods and average the periods to acquire the time averaged-value $\mu_t$, which can then be used to arrive at decisions.

If the measurements of μ are done over f number of time periods and the measurements are named as $\mu_1, \mu_2, \ldots \mu_f$, then the time averaged value of μ can be determined by $$\mu t = \frac{\left(\sum_{a=1}^{f} \mu_a\right)}{f}$$

where f is the number of time samples. This operation may reflect a time average of the AUS score μ in order to reduce the error and to take care of factors such as nature of application and time based usage of application (Christmas time, etc).

Example Results

An application used 100% of the time (e.g., in consideration of "business value" as discussed above) may have a score of $\mu_t=1$. An Application which is not used at all may have a score of $\mu_t=0$. For the purposes of optimizing licenses which are sold based on the "Per-CPU" model, the enterprise may then need to determine for its application a benchmark value $\mu_b$ which represents the Application Usage Barrier such that if $\mu_t < \mu_b$, then the application is not being used sufficiently and conversely if $\mu_t >= \mu_b$, then the Application is being used sufficiently. The system may then drive towards optimizing the number of resources such that $\mu_t$ is always greater than $\mu_b$.

If the $\mu_t < \mu_b$, then the system may not be used efficiently and the enterprise may consider removing some extra nodes in a tier and hence possibly releasing some servers and associated costly middleware licenses in a systematic manner to drive to a point where $\mu_t >= \mu_b$.

Figure 6:
FIG. 6 is a table depicting certain example barrier values as may occur in some embodiments.

FIG. 6 is a table depicting certain example barrier values as may occur in some embodiments. Where a μ is determined between barrier values $\mu_1$ and $\mu_2$ a pricing of 2x may be selected (where x is a baseline minimal price), and so forth. A software vendor which sells the software based on this model can arrive at barrier values $\mu_1, \mu_2, \mu_3, \mu_4$ etc. suitable to their needs. The auditor may define ranges and fix their pricing such that the costs of software as perceived by the enterprise are truly according to the business value that the application has delivered.

Note the pricing strategy shown in the table 600 is just an example and different licensors in different situations will select prices accordingly.

Contextual Considerations of Some Embodiments

Certain assumptions may be made in some embodiments so as to simplify the parameters to the above algorithm. Some embodiments assume that each tier in the application is composed of nodes which specifically cater to the needs of this application. For example, a given node does not serve two different Applications. Some embodiments will not make this assumption and will ascertain the subset of nodes associated with the application. In certain environments, the same middleware (e.g., Oracle WebLogic®) may be used to host two applications on a given node. While such a scenario is not often seen within an Enterprise, some embodiments will still seek to accommodate this situation, by segregating the middleware's services for each application. Generally, however, the algorithms disclosed herein assume that the middleware on a given node only caters to a single application.

Some embodiments assume that each node in the tier can have multiple types or instances of middleware installed, however all of these instances serve the same application. Some embodiments will not make this assumption and will instead ascertain the middleware subset associated with the application. Particularly, the system may assume that a single node might serve multiple tiers such as the application server and the DB server hosted on the same node. Some embodiments may assume that even though multiple tiers are on the single node, they serve a single application whose AUS is being determined.

Though each node in the ecosystem may be implemented upon a different set of hardware, there may be various characteristics common to each hardware configuration. Some embodiments may apply a common ratio based characteristic across all the sets of hardware. For example, CPU utilization may be calculated differently for a CPU manufactured by Intel® as compared to a CPU manufactured by AMD. Using an absolute number for CPU utilization may introduce an error. Accordingly, some embodiments use a ratio, such as CPU utilization ratio, to standardize the readings.

Some embodiments assume that all characteristics, e.g., Server Hardware, Middleware or Application characteristics, add on to the favorability condition. If the criteria do not indicate a favorable condition, then the criterion may be transformed into one before it is injected into the above formulae. The parameters may generally reflect the positive nature of the Application usage. For example, a parameter like CPU utilization ratio by the Application may contribute positively to the computation of the AUS. However, if the parameter was "CPU free ratio", the parameter may not truly reflect the usage (and hence does not add to the favorability condition in some embodiments).

Some embodiments assume that a middleware implementation can expose several characteristics from several different modules. However, an application might use only a few of these modules. Accordingly, in some embodiments, the system will identify and include only these modules into the calculation. For example, a middleware server may contain support for EJBs (Enterprise Java Beans), JSPs (Java Server Pages), and MQ-functionality. But if the application does not use MQ functionality then this parameter need not be monitored and there may be no use considering this when determining the AUS. Often, the Application Vendor, having intimate knowledge of the application's actual architecture, may be in the best position to decide which factors should be monitored to determine the AUS.

Maintenance Accommodation

In some embodiments, even if certain middleware is doing a periodic maintenance activity unrelated to the business application, some embodiments will include the middleware's characteristics in the Application Usage Score's determination. This may result in an erroneous score and might introduce noise into this analysis. The user or the auditor may adjust the characteristics considered by the system to anticipate such behavior.

Measuring Characteristics

Many values may be used to measure and characterize the performance of the Server Hardware, Middleware and the Application Server. However, not all these parameters need to be used to determine a suitable AUS in many situations. Accordingly, some embodiments determine only some minimal characteristics which provide an idea of the machine usage.

Server Hardware Characteristics

The following are some examples of server hardware characteristics that may be considered. For example, the percentage of Processor Time utilized in non-privileged mode may be used in some embodiments. The score may be adjusted between 0 and 1 based upon the percentage.

Some embodiments may use the percentage of utilization based on Processor Queue Length. In some situations, the ideal Processor Queue length may be 1-3 threads per core. Anything more than 3 per core may indicate a processor bottleneck. However for the purposes of the usage monitoring, some embodiments assume 100% for any value greater than 3 per core. Some embodiments assume a value of 0% for an absolute zero. Other values will be adjusted to a percentage according to the following formula, e.g.

$$\% \text{ Utilization(Proc QueueLength)} = \begin{cases} 0, & \text{if avg. processor queue length} = 0 \\ 1, & \text{if avg processor queue length} >= 3 \\ \dfrac{\text{avg. processor queue length}}{3}, & \text{otherwise} \end{cases}$$

Some embodiments may use the context switches per second as a server characteristic value. For example, $$\text{Context Switch Score} = \begin{cases} 0, & \text{if avg. context switch} <= 50 \\ 1, & \text{if avg context switch rate} > 500 \\ \dfrac{\text{context switch rate} - 50}{500 - 50}, & \text{otherwise} \end{cases}$$

Additionally, some embodiments may use the memory used as a characteristic indication.

$$\text{Memory Used Score} = \begin{cases} 0, & \text{if the average memory used is 0\%} \\ 1, & \text{if the average memory used is 50\% or above} \\ \dfrac{\text{average memory used \%}}{50}, & \text{otherwise} \end{cases}$$

One or more of the Utilization percentage, Context Switch score, and Memory used, may be used in combination in some embodiments. Complementary weights may be used for such combinations to avoid "double counting" of the same parameter when its value overlaps (e.g., both depend from a same underlying feature) with another characteristics. Such complements may be empirically determined. FIG. 7 is a table depicting certain example server characteristic weight values as may occur in some embodiments.

Middleware Characteristics

There is a great deal of middleware software available on the market, much of which caters to different needs and segments. Considering this lack of standardization, some embodiments rely upon the user or auditor to identify appropriate characteristics for monitoring. A different set of characteristics may need to be considered according to the type of middleware concerned.

Generally, middleware may be categorized into the following types: a Generic Application Server Characteristics (e.g., Java based); Generic Web Server Characteristics; Specialized Application Server Characteristics; Database Characteristics; and IIS Characteristics.

The following criteria may be used in some embodiments to compute the score which will contribute to the overall middleware score wherever a number is calculated.

$$\text{Score} = \begin{cases} 1, & \text{if the characteristic denotes a usage greater than 0} \\ 0, & \text{otherwise} \end{cases}$$

Wherever a percentage is measured, the score may be computed between 0 and 1, based on the percentage.

Middleware Characteristics—Generic Application Server Characteristics

Some embodiments employ the following characteristic for any generic Application Server that is available in the market, e.g., Oracle Weblogic® or IBM Websphere®. There are several characteristics that are considered in the case of an application server. However it is important to note that if an application server has 10 modules, and then the actual application makes use of only 3 of these 10 modules, then the monitoring may be considered for these 3 modules only.

Some embodiments consider the Enterprise Java Bean (EJB) Module Characteristics, which may include Generic Metrics. The Generic Metrics may include: the number of active methods of the active EJBs; the number of Instantiates and Destroys of EJB instances; and the total number of EJB method calls. The characteristics may also include the Entity Bean Characteristics. The Entity Bean Characteristics may include: the number of Creates, Destroys, Instantiates, Loads, Passivates, Removes and Stores for the Entity Beans; and the number of EJB methods executed in the last interval.

The characteristics may also include the Session Bean Characteristics—"Stateful" and "Stateless". The Session Bean Characteristics may include: the number of Activates, Creates, Destroys, Instantiates, Passivates, and Removes; and the EJB method call count during last interval.

The characteristics may also include the "Message Driven Bean Characteristics". The Message Driven Bean Characteristics may include the number of active methods and the number of destroys instantiated during the last interval.

The JSP/Servlet Characteristics may include the number of requests per second during the last interval. The Web-Module Characteristics may include the number of loaded servlets/the number or reloaded servlets. The Web-Service Characteristics may include the number of -requests received & dispatched. The JMS Characteristics may be similar to of the same as characteristics of the Websphere MQ below. The JDBC Provider and JDBC Characteristics may include: the number of connection handles; the number of creates and destroys for all registered providers; the number of allocations; the number of connections that are in waiting state; the number of managed connections. Characteristics based on the JTA (Transaction) may include: the number of active transactions; the number of initiated transactions that are not yet committed; and the number of rolled back transactions. The App-Server JVM Characteristics may include the percentage of total allocated memory used by the App-Server JVM. Other Characteristics such as Thread-Pool Characteristics may be considered. The Thread-Pool Characteristics may include: the number of active threads and the number of threads created and/or destroyed. FIG. 8 is a table depicting certain example weighting values for business tier and database tier criteria as may occur in some embodiments.

In some embodiments, for all of the above criteria, if a characteristic value is being measured, the score is to be computed as 1, if the characteristic value is greater than 0, or zero otherwise, if there is no established benchmark. The Application Vendor may be the person who can give an exact idea of how many transactions/second for a given characteristic might be considered as an indicator of the fact that the application was used.

Middleware Characteristics—Generic Web Server Characteristics

In some embodiments addressed to generic Web Servers, e.g. Apache HTTP Server or the NGinx server, various characteristics may be used to determine the Application Usage. For example, the system may determine the number of active connections, the number of total accesses, and the number of requests per second. The system may also determine the percentage of busy workers to the total number of workers available.

Specialized Application Server Characteristics

Some embodiments are addressed to specialized Application Servers, e.g. Oracle Forms®, Oracle Portal®, or Websphere MQ® servers which do specialized operations and can be deployed either in a standalone fashion or as a module to an existing Application Server. Determining the AUS of such an Application Server may require the monitoring of parameters that are unique to that particular server. As an example, the following list of characteristics could be monitored to determine the AUS of a Websphere MQ® Series server: the number of messages sent/received in channel; the Local/Remote Queue percentage used; the number of messages sent/received by the Queue Manager; Per Queue Characteristics such as the number of input and output handles.

Database Characteristics

There are several databases in the market, including e.g., Oracle®, DB2®, SQL Server® and MySQL®. Though each of these databases exposes a lot of performance indicators, as an example, some embodiments may use one or more of the following sample values to diagnose whether the database is actually being used or not.

For an Oracle® Database, for example, the system may use: the availability of the database, the score computed either as 0 (unavailable) or 1 (available); the number of open connections; the average number of Executions of SQL statements against the database; the average number of reads/writes to the database and/or to the tablespace and/or to the data file.

For a DB2® Database various characteristics such as the following can be analyzed: availability of the database; a score computed either as 0 (unavailable) or 1 (available); the number of currently active and connected application; the Average Rate of database static and dynamic SQL statements; the average physical/logical/direct reads/writes to the database/cache.

For an MySQL® Database various characteristics such as the following can be analyzed: Availability of the databases, e.g., a score computed either as 0 (unavailable) or 1 (available); # of Open Connections; # of insert/delete/select/update queries per second.

For an SQL® Server Database various characteristics such as the following can be analyzed: the availability of the databases, e.g., a score computed either as 0 (unavailable) or 1 (available); the number of active transactions on the database.

For an IIS® the following characteristics can be measured. It is possible that a given application only uses certain modules and hence it is the responsibility of the user to actually configure which modules need to be considered in computation of the AUS. The system may consider ASP Characteristics, such as the number of transactions per second and/or the number of requests per second. The system may consider ASP.Net Characteristics, e.g., the number of applications running and the number of requests queued. The system may consider ASP.Net Application Characteristics, e.g., the number of anonymous requests/second; and the requests per second. The system may consider FTP Service Characteristics (if enabled), e.g., Current Connections, Bytes/Files Received/Sent per second.

The system may also consider IPv4 or IPv6 datagrams sent/received per second, Memory page reads/writes per second, NNTP Characteristics (if NNTP is enabled) such as the articles received/posted/deleted/sent per second, SMTP Characteristics (if enabled) such as messages sent/received/delivered per second, WWW Service Characteristics (if enabled), such as the number of CGI requests, the number of ISAPI extension requests, and the Total Get/Post/Head requests.

Application Characteristics

In some embodiments, some application characteristics may be all or partially covered by the Server and Middleware Characteristics. An example of an application characteristic is the Application Response Time.

The Application Response time is the amount of time within which a pre-defined URL of the Application has to return with a predefined result criteria within a pre-defined timeout value, e.g., $$\text{App Resp Time Score} = \begin{cases} 0, & \text{if no response received or a timeout happened} \\ 1, & \text{if a correct response was received before timeout} \\ 0.5, & \text{otherwise} \end{cases}$$

The "predefined" criteria may be determined dynamically in some embodiments. The "otherwise" condition here indicates that the response was received before the timeout but was not an expected response. For example, consider a situation where a page showing incentives for a given employee given a proper employee id and a timeout value for a sample response was set to 5 seconds. An "Application Resp. Time Score" of 0 means that even though a proper/improper employee ID was given to that page as input, the response (of the actual incentive or an error telling us that the employee id was not correct) was not received within 5 seconds. Conversely, an Application Resp. Time Score of 1 means that a suitable response was received within 5 seconds. An Application Resp. Time Score of 0.5 means that a response was received within the timeout, but was not an expected response.

Though the Application response time above is a particular example, one will recognize that many other application characteristics may be considered. For example, memory usage, CPU usage, network connectivity, etc. may all be taken into consideration as application characteristics.

Weights for Middleware Server Characteristics and Application Characteristics

The following example describes one possible determination of the middleware server, application characteristics, and the AUS. Consider a sample shopping application which is built on the J2EE stack. Assume that this Application is deployed on a single-node IBM Websphere® server and has a set of JSP pages which constitute the presentation layer. The business logic and the presentation layer may be fused into the same Enterprise Archive File (EAR) and may be served by using a set of classes (Core Java+JTA+MQ) and talks to a database (say IBM DB2®). For this simplistic example, the set of criteria under consideration and its relative weights may be as depicted in FIG. 8. FIG. 8 is a table depicting certain example weighting values for business tier and database tier criteria as may occur in some embodiments. These weights may be used when measuring Server Characteristics in some embodiments.

For purposes of explanation, further assume that for the given time period under consideration, a weight of 0 has been assigned for server hardware characteristics (e.g., server hardware utilization is not to be considered at all). Assume that the overall application response time for any application level requests are as expected and within the specified timeout value of 3 seconds. For simplicity in this example, we do not consider any other application level characteristics, though real-world embodiments may naturally consider many more.

Then the node score $\alpha$ may be computed using the following example values (one will recognize these values as hypotheticals for purposes of explanation with possibly little correspondence to a real-world situation):

| Middleware Characteristic (A) | Weight Assigned (B) | Actual Usage measured (C) | Agreed Benchmark Values (X) | Usage score for criteria (D) (a ratio determined from C and X bounded between 0 and 1) | Weighted score for characteristic (E = D * B) |
|---|---|---|---|---|---|
| JSP # of request per second for the last second | 0.4 | 15 | 0-30 | 0.5 | 0.2 |
| MQ - # of messages sent/received in channel during the last second | 0.15 | 5 | Greater than 4 | 1 | 0.15 |
| MQ – Local/remote queue percentage used per second | 0.15 | 5% | Greater than or equal to 5% | 1 | 0.15 |
| JTA - # of active transactions per second | 0.3 | 1 | Greater than 2 | 0.5 | 0.15 |
| Score of business tier | | | | | 0.65 |
| DB - Average rate of static and dynamic SQL execution per second | 0.5 | 2 | Greater than 8 | 0.25 | 0.125 |
| DB - Average reads/writes to DB per second | 0.5 | 2 | Greater than 8 | 0.25 | 0.125 |
| Score of DB tier | | | | | 0.25 |

The node score $\alpha=0.65$ for the business tier and $\alpha=0.25$ for the DB tier. Since this example consists only of a single node for each of the tiers, the tier score $\pi$ may also be the same as the node scores. The node score $\pi=0.65$ for the business tier and $\pi=0.25$ for the DB tier. The combined score for all middleware and server scores ($\beta$) is an average of the above. $\beta$=(Avg. of 0.25 and 0.65)=0.45 assuming that the business tiers and DB tier usage of the application contribute equally to the AUS.

Since in our assumption the overall Application response time is within the specified timeout value and there are no other application level characteristics, the Application Characteristic score is given by $\lambda=1$. Thus, the system may calculate the AUS as $\mu=\lambda*\beta=1*0.45=0.45$.

Computer System

Figure 9:
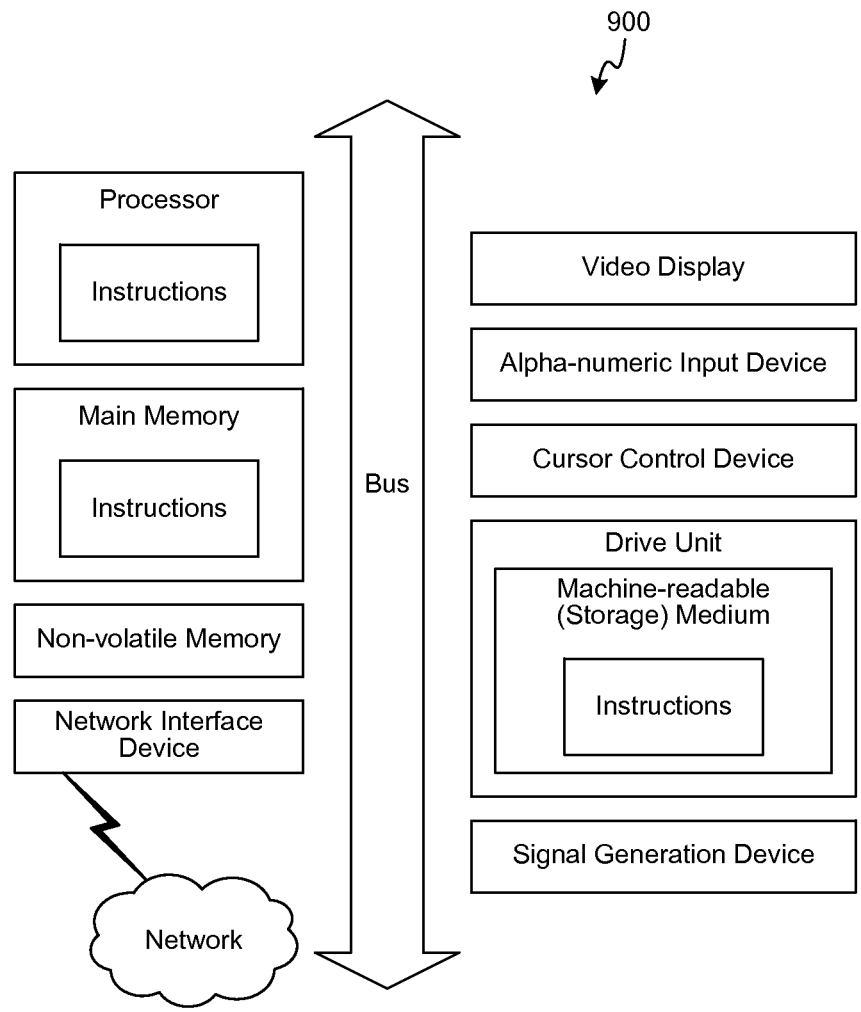
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine 900 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Remarks

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A computer-implemented method for contextually assessing the relative usage of an n-tier enterprise application in a given business environment context comprising:
   determining the n-tier enterprise application's deployment structure including the number of tiers that are deployed and the number of nodes that service each tier;
   determining a plurality of server characteristic values based upon the n-tier enterprise application's deployment structure;
   summing the plurality of server characteristic values weighted by a plurality of server characteristic weights to generate a server hardware score for a node, the server characteristic weights having values in accordance with the relative usage associated with the business environment context;
   determining a plurality of middleware characteristic values based upon the n-tier enterprise application's deployment structure;
   summing the plurality of middleware characteristic values weighted by a plurality of middleware characteristic weights to generate a middleware score for the node, the plurality of middleware characteristic weights having values in accordance with the relative usage associated with the business environment context;
   generating a first node score for the node by combining the server hardware score and the middleware score, where the node is one of a plurality of nodes in a tier of the n-tier enterprise application;
   determining an aggregate tier node score by summing a plurality of node scores in the tier, including the first node score, where each of the node scores is weighted based upon the node's usage by the n-tier enterprise application, the aggregate tier node normalized by the number of nodes in the tier;
   determining a combined application middleware and server score by dividing the aggregate tier node score by a number of tiers used by the application;
   determining an application characteristics score by summing a plurality of application characteristic values weighted by a plurality of weights; and
   determining the relative usage of the n-tier enterprise application for the given business environment context by scaling the application characteristics score by the combined application middleware and server score.

2. The computer-implemented method of claim 1, wherein the number of tiers used by the application comprises a business logic tier and a persistence tier.

3. The computer-implemented method of claim 1, wherein the server characteristic values include an indication of the context switches on the server.

4. The computer-implemented method of claim 1, wherein the middleware characteristic values include one or more of an indication of a number of active methods of Enterprise Java Bean (EJB) modules, an indication of a number of instantiates and destroys of EJB instances, and the total number of EJB method calls.

5. The computer-implemented method of claim 1, the method further comprising aggregating the Application Usage Score with a plurality of Application Usage Scores determined over a period of time.

6. The computer-implemented method of claim 1, wherein determining an aggregate tier node score comprises determining a load-balancing distribution of the application's operations across nodes.

7. A non-transitory computer-readable medium comprising instructions configured to cause at least one processor to perform a method to contextually assess the relative usage of an n-tier enterprise application in a given business environment context, the method comprising:
   determining the n-tier enterprise application's deployment structure including the number of tiers that are deployed and the number of nodes that service each tier;
   determining a plurality of server characteristic values based upon the n-tier enterprise application's deployment structure;
   summing the plurality of server characteristic values weighted by a plurality of server characteristic weights to generate a server hardware score for a node, the server characteristic weights having values in accordance with the relative usage associated with the business environment context;
   determining a plurality of middleware characteristic values based upon the n-tier enterprise application's deployment structure;
   summing the plurality of middleware characteristic values weighted by a plurality of middleware characteristic weights to generate a middleware score for the node, the plurality of middleware characteristic weights having values in accordance with the relative usage associated with the business environment context;
   generating a first node score for the node by combining the server hardware score and the middleware score, where the node is one of a plurality of nodes in a tier of the n-tier enterprise application;
   determining an aggregate tier node score by summing a plurality of node scores in the tier, including the first node score, where each of the node scores is weighted based upon the node's usage by the n-tier enterprise application, the aggregate tier node normalized by the number of nodes in the tier;
   determining a combined application middleware and server score by dividing the aggregate tier node score by a number of tiers used by the application;
   determining an application characteristics score by summing a plurality of application characteristic values weighted by a plurality of weights; and
   determining the relative usage of the n-tier enterprise application for the given business environment context by scaling the application characteristics score by the combined application middleware and server score.

8. The non-transitory computer-readable medium of claim 7, wherein a first tier of the n-tiers comprises a business logic tier and a second tier of the n-tiers comprises a persistence tier.

9. The non-transitory computer-readable medium of claim 7, the method further comprising determining a licensing value based on a determination that the relative usage of the n-tier enterprise application exceeds a first application usage barrier, but is less than a second application usage barrier.

10. The non-transitory computer-readable medium of claim 7, wherein the n-tiers used by the application comprise a business logic tier and a persistence tier.

11. The non-transitory computer-readable medium of claim 7, wherein the server characteristic values include an indication of the context switches on the server.

12. The non-transitory computer-readable medium of claim 7, wherein the middleware characteristic values include one or more of an indication of a number of active methods of Enterprise Java Bean (EJB) modules, an indication of a number of instantiates and destroys of EJB instances, and the total number of EJB method calls.

13. The non-transitory computer-readable medium of claim 7, the method further comprising aggregating the Application Usage Score with a plurality of Application Usage Scores determined over a period of time.

14. A computer system comprising:
   at least one processor;
   at least one memory comprising instructions configured to cause the at least one processor to perform a method to contextually assess the relative usage of an n-tier enterprise application in a given business environment context, the method comprising:
   determining the n-tier enterprise application's deployment structure including the number of tiers that are deployed and the number of nodes that service each tier;
   determining a plurality of server characteristic values based upon the n-tier enterprise application's deployment structure;
   summing the plurality of server characteristic values weighted by a plurality of server characteristic weights to generate a server hardware score for a node, the server characteristic weights having values in accordance with the relative usage associated with the business environment context;
   determining a plurality of middleware characteristic values based upon the n-tier enterprise application's deployment structure;
   summing the plurality of middleware characteristic values weighted by a plurality of middleware characteristic weights to generate a middleware score for the node, the plurality of middleware characteristic weights having values in accordance with the relative usage associated with the business environment context;
   generating a first node score for the node by combining the server hardware score and the middleware score, where the node is one of a plurality of nodes in a tier of the n-tier enterprise application;
   determining an aggregate tier node score by summing a plurality of node scores in the tier, including the first node score, where each of the node scores is weighted based upon the node's usage by the n-tier enterprise application, the aggregate tier node normalized by the number of nodes in the tier;
   determining a combined application middleware and server score by dividing the aggregate tier node score by a number of tiers used by the application;
   determining an application characteristics score by summing a plurality of application characteristic values weighted by a plurality of weights; and
   determining the relative usage of the n-tier enterprise application for the given business environment context by scaling the application characteristics score by the combined application middleware and server score.

15. The computer system of claim 14, wherein a first tier of the n-tiers comprises a business logic tier and a second tier of the n-tiers comprises a persistence tier.

16. The computer system of claim 14, the method further comprising determining a licensing value based on a determination that the relative usage of the n-tier enterprise application exceeds a first application usage barrier, but is less than a second application usage barrier.

17. The computer system of claim 14, wherein the n-tiers used by the application comprise a business logic tier and a persistence tier.

18. The computer system of claim 14, wherein the server characteristic values include an indication of the context switches on the server.

19. The computer system of claim 14, wherein the middleware characteristic values include one or more of an indication of a number of active methods of Enterprise Java Bean (EJB) modules, an indication of a number of instantiates and destroys of EJB instances, and the total number of EJB method calls.

20. The computer system of claim 14, the method further comprising aggregating the Application Usage Score with a plurality of Application Usage Scores determined over a period of time.

* * * * *